US012683921B2

(12) United States Patent
DiFonzo

(10) Patent No.: US 12,683,921 B2
(45) Date of Patent: Jul. 14, 2026

(54) PEER-TO-PEER MODULAR AUTOMATION SCHEME

(71) Applicant: G & W Electric Company, Bolingbrook, IL (US)

(72) Inventor: Nicholas Carmine DiFonzo, Des Plaines, IL (US)

(73) Assignee: G & W Electric Company, Bolingbrook, IL (US)

( * ) Notice: Subject to any disclaimer, the term of this patent is extended or adjusted under 35 U.S.C. 154(b) by 0 days.

(21) Appl. No.: 19/132,746

(22) PCT Filed: Oct. 4, 2024

(86) PCT No.: PCT/US2024/050049
§ 371 (c)(1),
(2) Date: May 23, 2025

(87) PCT Pub. No.: WO2025/183746
PCT Pub. Date: Sep. 4, 2025

(65) Prior Publication Data
US 2026/0113290 A1      Apr. 23, 2026

Related U.S. Application Data

(60) Provisional application No. 63/558,038, filed on Feb. 26, 2024.

(51) Int. Cl.
*G06F 15/16*      (2006.01)
*H04L 41/0686*      (2022.01)
*H04L 51/18*      (2022.01)

(52) U.S. Cl.
CPC .......... *H04L 51/18* (2013.01); *H04L 41/0686* (2013.01)

(58) Field of Classification Search
CPC ........................... H04L 41/0686; H04L 51/18
(Continued)

(56) References Cited

U.S. PATENT DOCUMENTS 7,747,356 B2 *   6/2010   Andarawis ................ G06F 1/12
                                                               700/20
7,844,440 B2 *   11/2010   Nasle ...................... G06F 30/20
                                                               702/182

(Continued)

OTHER PUBLICATIONS

Mexican Patent Office. Office Action for Application No. MX/a/2025/006160, dated Sep. 5, 2025 (8 pages with machine translation).

(Continued)

*Primary Examiner* — Moustafa M Meky
(74) *Attorney, Agent, or Firm* — Michael Best & Friedrich LLP

(57) ABSTRACT

In one example, an automation controller includes an electronic processor, a memory, a first peer messaging interface configured to connect to a first peer device, a second peer messaging interface configured to connect to a second peer device, and an input/output interface. The electronic processor is configured to receive, via the input/output interface, an interrupter status signal, and to transmit, via the first or second peer messaging interface, a message to a peer device based on the interrupter status signal. The electronic processor is also configured to receive a message from the peer device indicating a status of a peer interrupter, and to update an interrupter status variable in memory based on the status of the peer interrupter and the interrupter status signal. The electronic controller is also configured to transmit a signal to open or close an interrupter based on the updated interrupter status variable.

20 Claims, 7 Drawing Sheets

(58) Field of Classification Search
USPC ................................................. 709/200–206
See application file for complete search history.

(56) References Cited

U.S. PATENT DOCUMENTS

| | | | | |
|---|---|---|---|---|
| 8,180,622 | B2 * | 5/2012 | Nasle ....................... | G06F 30/20 |
| | | | | 703/18 |
| 8,229,722 | B2 * | 7/2012 | Nasle ...................... | G05B 17/02 |
| | | | | 703/13 |
| 8,775,934 | B2 * | 7/2014 | Nasle ........................ | G06F 8/38 |
| | | | | 715/740 |
| 9,052,731 | B2 * | 6/2015 | Smit .......................... | G05F 1/66 |
| 9,673,626 | B2 * | 6/2017 | Normoyle ................. | H02J 3/00 |
| 10,116,554 | B2 * | 10/2018 | Liu .......................... | H04L 47/10 |
| 10,333,301 | B2 * | 6/2019 | Gubba Ravikumar ... | H02J 3/00 |
| 10,771,341 | B2 * | 9/2020 | Janardhana ......... | H04L 41/0618 |
| 10,839,864 | B2 * | 11/2020 | Kwon .................... | G11C 16/30 |
| 11,258,295 | B2 * | 2/2022 | Chen ....................... | H02J 9/066 |
| 12,455,583 | B2 * | 10/2025 | Floriani .................. | G05F 1/595 |
| 2009/0112375 | A1 | 4/2009 | Popescu | |
| 2014/0078628 | A1 | 3/2014 | Valdes et al. | |
| 2018/0241198 | A1 | 8/2018 | Louco et al. | |
| 2018/0323611 | A1 * | 11/2018 | Gubba Ravikumar ... | H02J 3/00 |
| 2019/0312783 | A1 * | 10/2019 | Janardhana ........... | H04L 49/357 |
| 2020/0083012 | A1 | 3/2020 | Fasano et al. | |
| 2020/0194200 | A1 * | 6/2020 | Bishop ................. | H01H 33/668 |
| 2023/0254697 | A1 | 8/2023 | Freeman et al. | |
| 2023/0359235 | A1 * | 11/2023 | Floriani ................ | H02M 1/325 |
| 2024/0145193 | A1 * | 5/2024 | Santhanam ............ | H01H 9/168 |

OTHER PUBLICATIONS

International Search Report dated Dec. 30, 2024 for corresponding International Application No. PCT/US2024/050049 (2 pages).
International Written Opinion dated Dec. 30. 2024 for corresponding International Application No. PCT/US2024/050049 (12 pages).

* cited by examiner

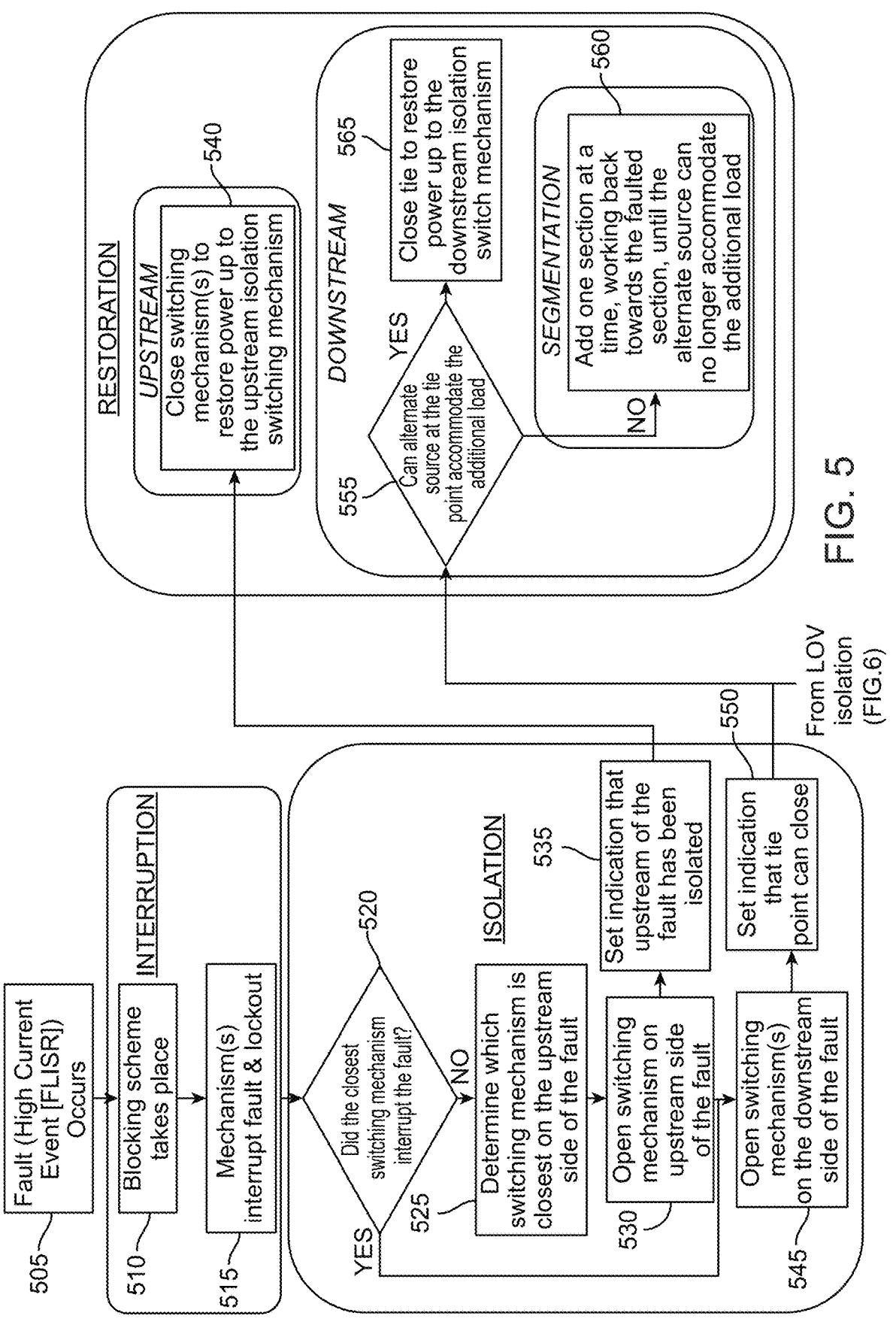

FIG. 5

RESTORATION

UPSTREAM — 540
Close switching mechanism(s) to restore power up to the upstream isolation switching mechanism DOWNSTREAM — 565
Close tie to restore power up to the downstream isolation switch mechanism 555 — Can alternate source at the tie point accommodate the additional load

YES

SEGMENTATION — 560
Add one section at a time, working back towards the faulted section, until the alternate source can no longer accommodate the additional load

NO

INTERRUPTION

505 — Fault (High Current Event [FLISR] Occurs

510 — Blocking scheme takes place

515 — Mechanism(s) interrupt fault & lockout

ISOLATION

520 — Did the closest switching mechanism interrupt the fault?

YES

NO

525 — Determine which switching mechanism is closest on the upstream side of the fault 530 — Open switching mechanism on upstream side of the fault 535 — Set indication that upstream of the fault has been isolated 545 — Open switching mechanism(s) on the downstream side of the fault 550 — Set indication that tie point can close From LOV isolation (FIG.6)

PEER-TO-PEER MODULAR AUTOMATION SCHEME

CROSS-REFERENCE TO RELATED APPLICATIONS

This application is a national stage filing under 35 U.S.C. § 371 of International Patent Application No. PCT/US2024/050049, filed on Oct. 4, 2024, which claims priority to U.S. Provisional Patent Application No. 63/558,038, filed Feb. 26, 2024, the entire contents of which are incorporated herein by reference.

FIELD

Examples relate to power distribution systems and, more particularly, to automation technologies that allow power distribution system switchgear to participate in an automation scheme to identify and isolate faults in a power distribution system and restore power to non-affected parts of the system in a decentralized manner.

BACKGROUND

Fault location, isolation, and service restoration (FLISR) schemes may be used in electrical power distribution systems (sometimes simply "power distribution systems") for various reasons (e.g., safety, continuity of service, and protection of power distribution components). FLISR schemes often require centralized logic to function properly. For example, a FLISR scheme may require each node in a power distribution system to communicate with a central controller for initial setup, or for updates on the statuses of surrounding nodes and switching devices.

SUMMARY

Embodiments, examples, features, and aspects provide, among other things, methods, and systems for automating FLISR and loss of voltage (LOV) response functions in a power distribution system using decentralized, node-level peer-to-peer messaging.

On example provides an automation controller including an electronic processor, a memory, a first peer messaging interface configured to connect to a first peer device, a second peer messaging interface configured to connect to a second peer device, and an input/output interface configured to connect to an interrupter. The electronic processor is configured to receive, via the input/output interface, an interrupter status signal, and to transmit, via the first or second peer messaging interface, a message to a peer device based on the interrupter status signal. The electronic processor is also configured receive, via the first or second peer messaging interface, a message from the peer device indicating a status of a peer interrupter, and to update an interrupter status variable in memory based on the status of the peer interrupter and the interrupter status signal. The electronic processor is further configured to transmit a signal, via the input/output interface, to open or close the interrupter based on the updated interrupter status variable.

Another example provides an interrupter comprising a switch, and an automation controller. The automation controller includes an electronic processor, a memory, a first peer messaging interface configured to connect to a first peer device, and a second peer messaging interface configured to connect to a second peer device. The electronic processor is configured to receive an interrupter status signal, and to transmit, via the first or second peer messaging interface, a message to a peer device based on the interrupter status signal. The electronic processor is also configured receive, via the first or second peer messaging interface, a message from the peer device indicating a status of a peer interrupter, and to update an interrupter status variable in memory based on the status of the peer interrupter and the interrupter status signal. The electronic processor is further configured to open or close the switch based on the updated interrupter status variable.

Another example provides a non-transitory computer-readable medium containing instructions that when executed by an electronic processor of an automation controller in a power distribution system cause the electronic processor to receive, via an input/output interface of the automation controller, an interrupter status signal. The instructions also cause the electronic processor to transmit, via a first peer messaging interface or a second peer messaging interface of the automation controller, a message to a peer device in the power distribution system based on the interrupter status signal. The instructions also cause the electronic processor to receive, via a first or second peer messaging interface of the automation controller, a message from the peer device indicating a status of a peer interrupter, and to update an interrupter status variable in a memory of the automation controller based on the status of the peer interrupter and the interrupter status signal. The instructions also cause the electronic processor to transmit a signal, via the input/output interface of the automation controller, to open or close the interrupter based on the updated interrupter status variable.

Other embodiments, examples, features and aspects will become apparent by consideration of the detailed description and accompanying drawings.

BRIEF DESCRIPTION OF THE DRAWINGS

FIG. 5 illustrates a flowchart of a method of using a plurality of automation controllers in a power distribution system to perform FLISR functions using peer-to-peer communications.

DETAILED DESCRIPTION

Before any embodiments, examples, features, and aspects are explained in detail, it is to be understood that examples described and illustrated are not limited in their application to the details of construction and the arrangement of components set forth in the following description or illustrated in the following drawings. The examples described and illustrated may be practiced or carried out in various ways and other implementations are possible.

In this document, the term "interrupter" is used as a generic term. As used herein, "interrupter" refers broadly to switching mechanisms configured to open and close an electric circuit. For the purposes of this disclosure, switches, reclosers, fault interrupters, sectionalizers, etc. may be used as interrupters. In this document, when an interrupter is in a "closed" state, the interrupter is conducting electricity. When the interrupter is in an "open" state, it is not conducting electricity.

Figures 1A, 1B:
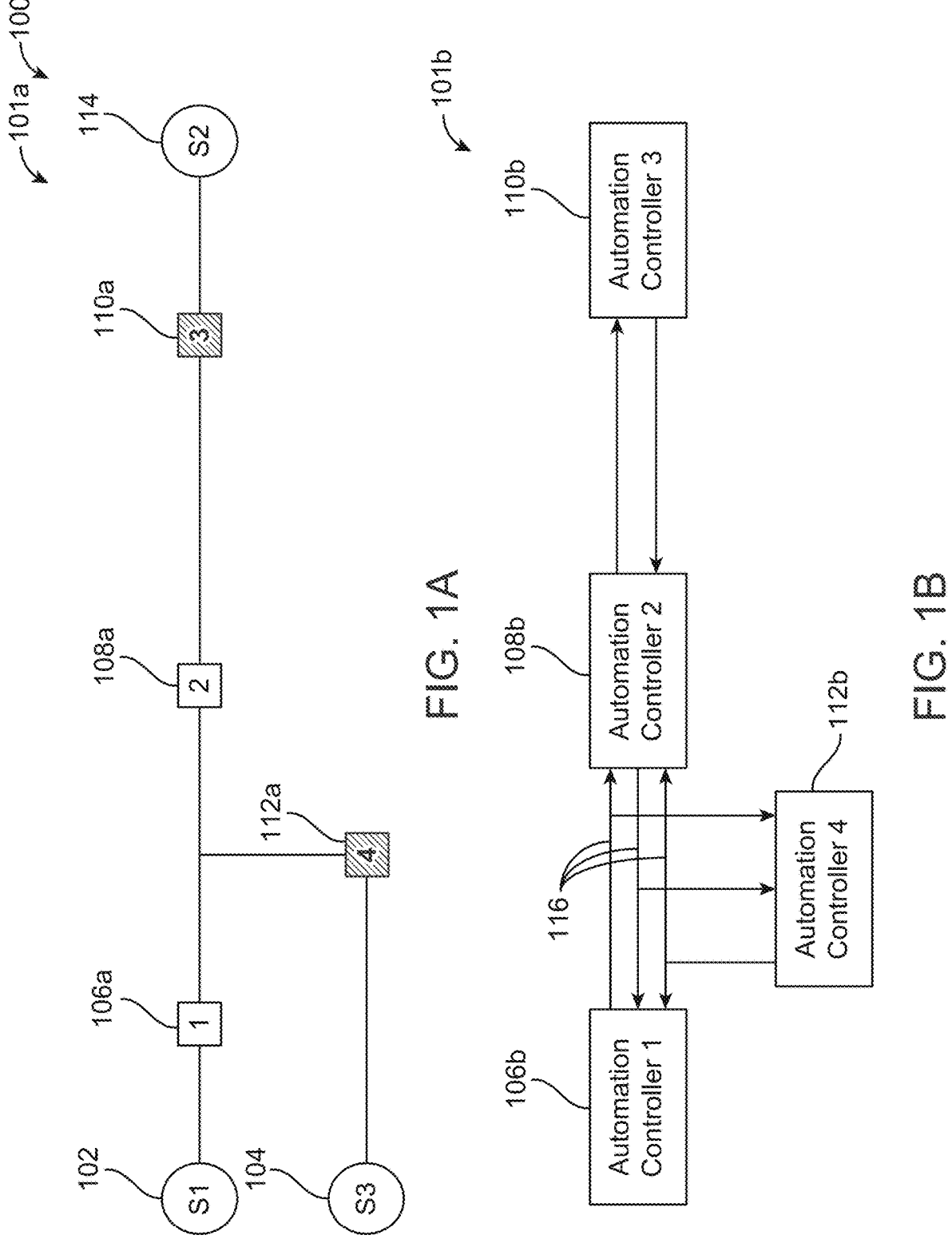
FIG. 1A illustrates a plurality of interrupters and power sources in a power distribution system.
FIG. 1B illustrates a plurality of automation controllers in a power distribution system configured to participate in peer-to-peer communications.

FIG. 1A illustrates a plurality of interrupters and power sources in an electrical power distribution system 100. In general, with respect to any respective reference point or location in a distribution system, upstream devices are located close (or near) to the source of electrical power and downstream devices are located close (near) to the electrical load. In FIG. 1A, all circuits are assumed to be radial, and upstream devices are located to the left of downstream devices. Power source 102 and power source 104 are on the upstream side of the power distribution system. Interrupter 106a, interrupter 108a, interrupter 110a, and interrupter 112a are downstream of power sources 102, 104. In this example, power source 114 may be considered an auxiliary power source and considered to be on the downstream side of the electrical power distribution system 100. The interrupters 106a, 108a, 110a, and 112a may be opened to interrupt a circuit (e.g., between a power source and a load), or closed to establish (or re-establish) a circuit between devices.

FIG. 1B illustrates a plurality of automation controllers 101b in a power distribution system (e.g., power distribution system 100) configured to participate in peer-to-peer communications. Automation controllers 101b may be connected to or included in interrupters 101a. The automation controllers 106b, 108b, 110b, 112b are configured to transmit messages to and receive messages from neighboring automation controllers (sometimes referred to herein as "peer devices"). In the example shown, the automation controllers 106b, 108b, 110b, 112b are configured to transmit messages (e.g., peer-to-peer publisher-subscriber messages) to devices to which the transmitting automation controller (e.g., automation controller 112b) is connected by one of communication lines 116. For example, automation controller 112b may be configured to transmit messages to and receive messages from automation controllers 106b, 108b because automation controllers 106b, 108b, 112b are connected to one another via communication lines 116. In the example shown, the messages transmitted between the plurality of automation controllers 101b may be generic object-oriented substation event (GOOSE) messages.

Figure 2:
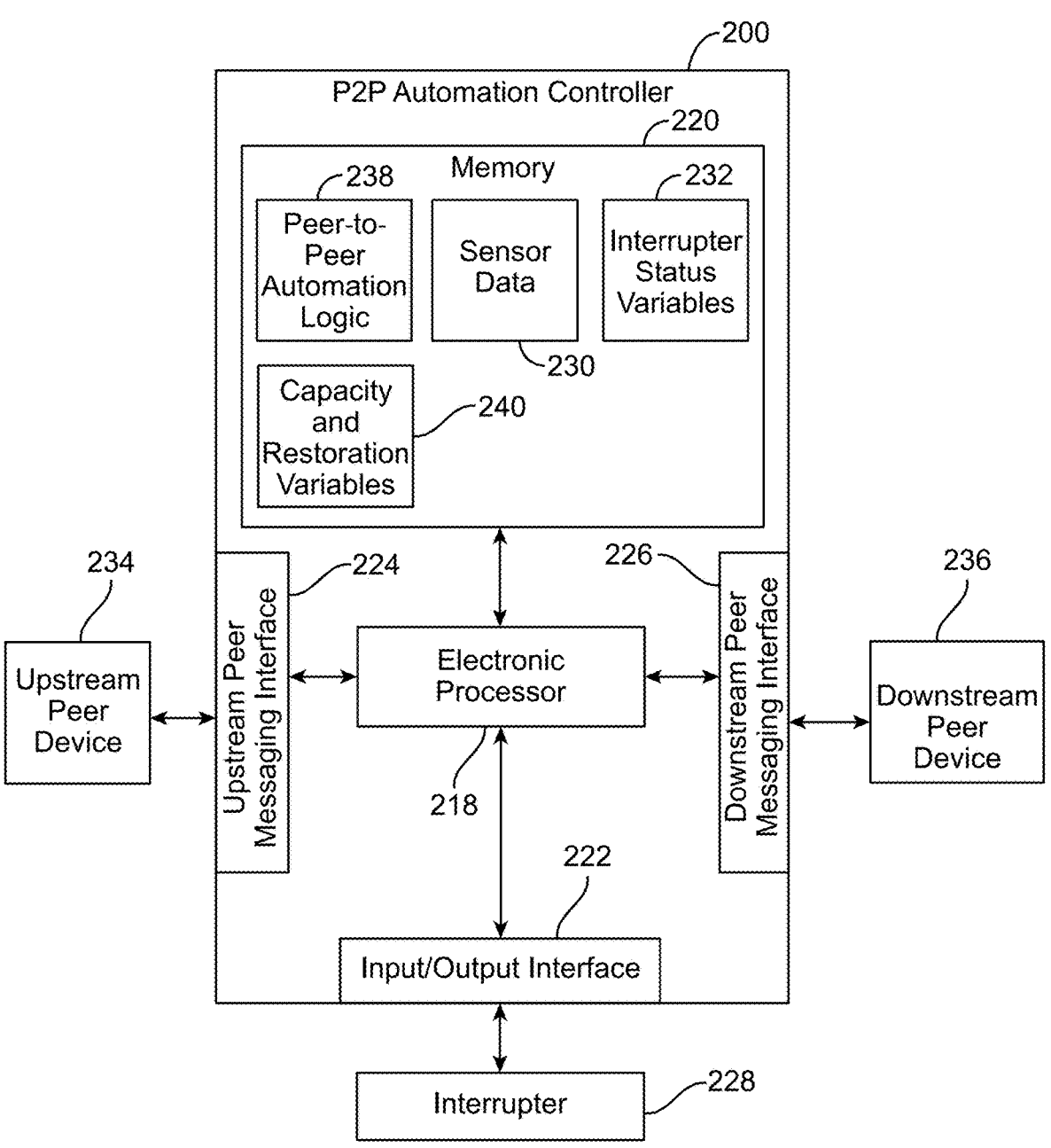
FIG. 2 illustrates hardware included in an automation controller.

FIG. 2 illustrates an example of hardware included in an automation controller 200. In the example shown, the automation controller 200 includes an electronic processor 218, a memory 220, and an input/output interface 222. The electronic processor 218 is configured to send and receive signals to and from the input/output interface 222. The electronic processor 218 is also configured to receive messages via an upstream peer messaging interface 224, and a downstream peer messaging interface 226 (for example, via the input/output interface 222). The input/output interface 226 is configured to receive signals from an interrupter 228 connected to the automation controller 200. In the example shown, the interrupter 228 is equipped with a sensor configured to transmit, to the input/output interface 222, a sensor signal (e.g., an analog sensor signal) indicating a characteristic or property (e.g., a current, a voltage, etc.) of an electrical system in which the interrupter 228 is installed. The electronic processor 218 is configured to receive these sensor signals and to update sensor data 230 in the memory 220 based on the sensor signals. In the example shown, the interrupter 228 is configured to transmit a status signal, indicating a state (e.g., open, closed, locked out, etc.) of the interrupter 228 to the input/output interface 222. The electronic processor 218 is configured to receive these status signals via the input/output interface 222 and to update interrupter status variables 232 in the memory 220 based on the status signals.

The electronic processor 218 is configured to parse messages received from the upstream peer device 234 and the downstream peer device 236, via the upstream peer messaging interface 224 and the downstream peer messaging interface 226, respectively. The electronic processor 218 updates the interrupter status variables 232 based on the content of the messages. In one example, if a message received at the upstream peer messaging interface 224 indicates that an interrupter connected to the upstream peer device 234 is experiencing a fault current, the electronic processor 218 updates the interrupter status variables 232 to reflect the status of the peer interrupter. As will be described in further detail below, the electronic processor 218 is configured to produce output messages based on the interrupter status variables by executing peer-to-peer automation logic 238.

The electronic processor 218 is also configured to store and update capacity and restoration variables 240 in memory 220. The electronic processor 218 may be configured to use peer-to-peer automation logic 238 to track max capacity of power sources (e.g., power source 102, 104, or 114) and to track downstream interrupter load based on sensor signals from the interrupter 228 and messages received from peer devices. The automation controller 200 may be configured to update the capacity and restoration variables 240 at regular intervals.

Interrupter 228 may correspond to any of interrupters 106a, 108a, 110a, or 112a, in the plurality of interrupters 101a. The automation controller 200 may correspond to any of the automation controllers 106b, 108b, 110b, or 112b in the plurality of automation controllers 101b. In some examples, the automation controller 200 is configured to determine, via the peer-to-peer automation logic 238, whether a loss of voltage is occurring at the interrupter 228 based on sensor signals received from the interrupter 228. In one example, the automation controller 200 receives an analog sensor signal from the interrupter 228, updates the sensor data 230 based on the received sensor signal, and determines, based on the updated sensor data 230, whether a loss of voltage is being sensed by the interrupter 228. The electronic processor may also be configured to update the interrupter status variables 232 based on the results of the determination. In some examples, the interrupter 228 is configured to transmit a discrete (on/off) sensor signal indicating the electrical property of the power distribution system (e.g., a loss of voltage signal, etc.). In such examples, the discrete signal will indicate plainly whether a current fault or loss of voltage is being sensed by the interrupter 228.

As will be described in greater detail below, the plurality of automation controllers 101b may be configured to use peer-to-peer communications and peer-to-peer automation logic 238 to perform fault identification, location, isolation, and service restoration (FLISR) functions without the need for a coordinating central controller or headend. The plurality of automation controllers 101*b* may also be configured to perform loss of voltage (LOV) location, isolation, and service restoration functions based only on peer-to-peer communications and peer-to-peer automation logic 238. In response to sensing a fault current or a loss of voltage, each automation controller 200 in the plurality of automation controllers 101*b* may be configured to transmit messages to its peers indicating a status/state of its own interrupter 228. Each automation controller 200 is also configured to receive these messages from upstream peer devices 234 and downstream peer devices 236, update its interrupter status variables 232, and to signal its own interrupter 228 to open or close, as appropriate, to perform FLISR and LOV functions.

Figure 3:
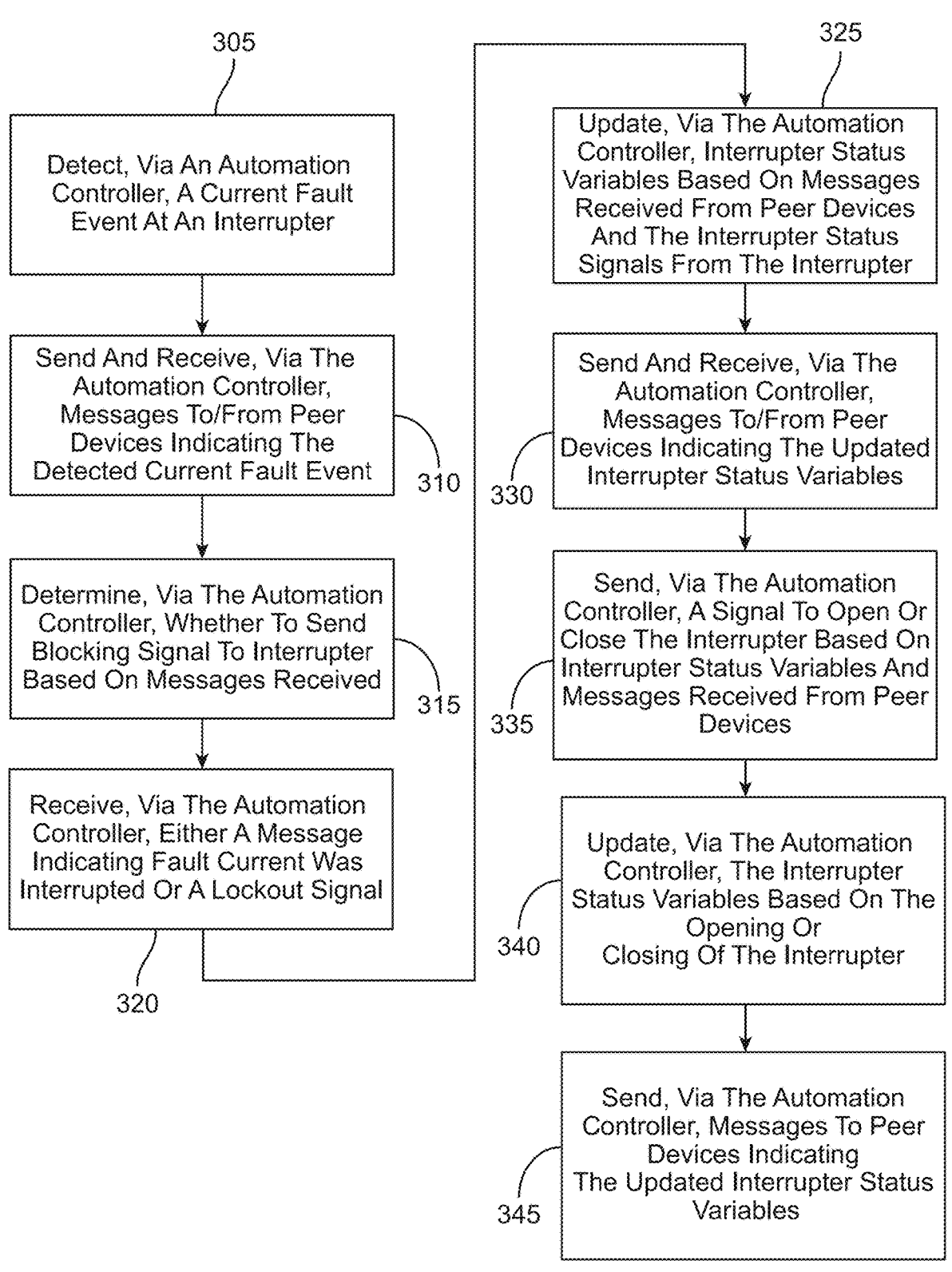
FIG. 3 illustrates a flowchart of a method of an automation controller participating in the performance fault location, isolation, and service restoration (FLISR) functions using peer-to-peer communications.
Figure 4:
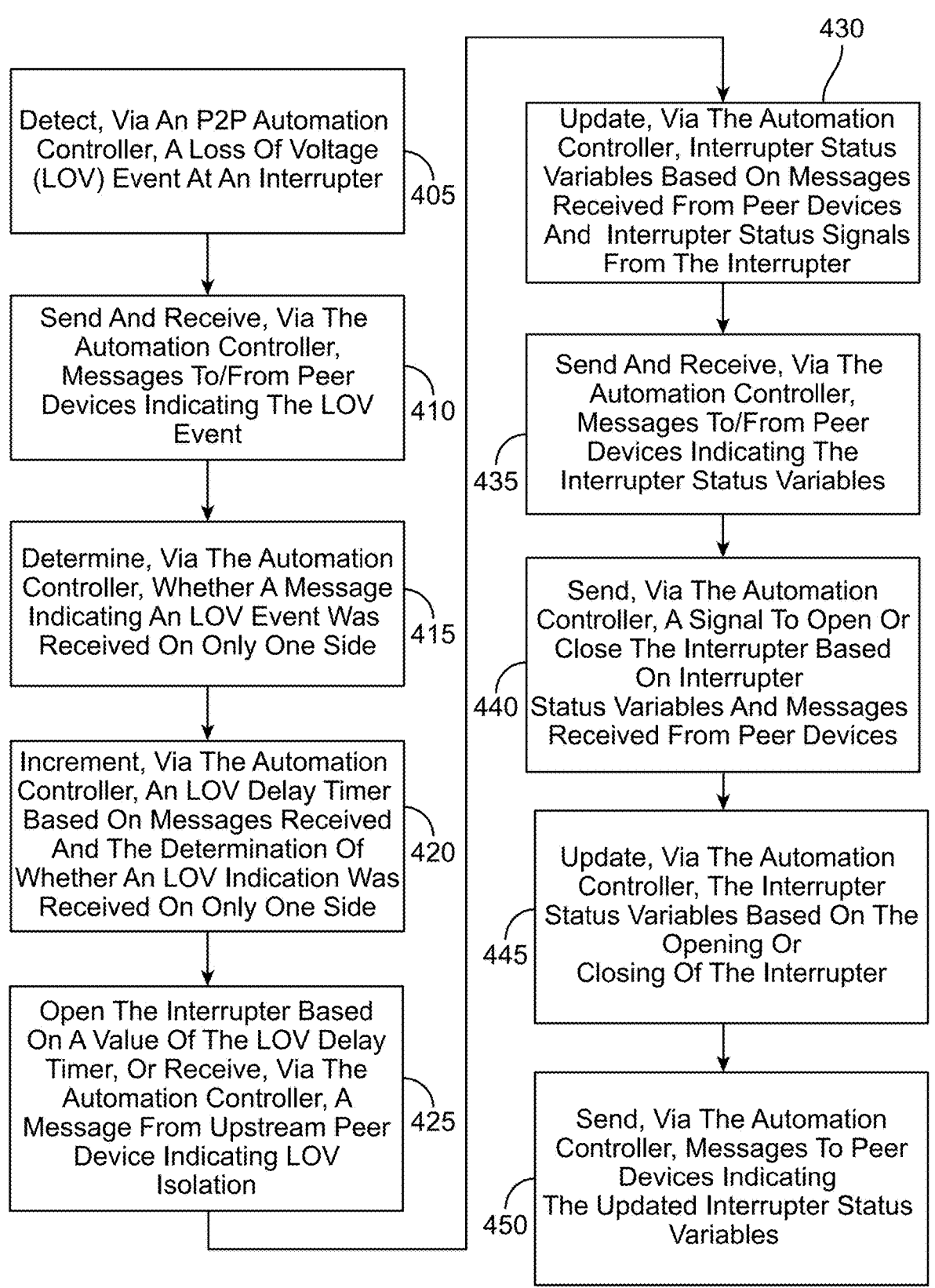
FIG. 4 illustrates a flowchart of a method of an automation controller participating in the performance of LOV response functions using peer-to-peer communications.

FIGS. 3 and 4 are described from the perspective of a single automation controller 200, selected from the plurality of automation controllers 101*b*, participating in FLISR and LOV functions. Accordingly, the descriptions of FIGS. 3 and 4 highlight the actions of taken by a single automation controller 200, in response to a current fault or an LOV, based on the peer-to-peer automation logic 238 stored, for example, in memory 220.

FIG. 3 illustrates a flowchart of an example method of an automation controller (e.g., automation controller 106*b*, 108*b*, 110*b*, 112*b*, or 200) participating in the performance of FLISR functions using peer-to-peer communications.

In the example shown, at block 305, the automation controller 200 detects a current fault event at interrupter 228. For example, the interrupter 228 may send a discrete (i.e., on/off) indicator signal to the electronic processor 218, indicating that the interrupter 228 is experiencing a current fault event.

At block 310, the automation controller 200 sends messages indicating the detected current fault event to upstream peer devices 234 and downstream peer devices 236. The automation controller 200 may also receive messages from upstream peer devices 234 or downstream peer devices 236 indicating that those devices are also experiencing a current fault event.

At block 315, if the automation controller 200 receives messages indicating that a current fault event is occurring at all connected upstream peer devices 234 and all connected downstream peer devices 236, the automation controller 200 transmits a blocking signal to interrupter 228, to delay tripping (e.g., opening) of its own interrupter 228. These circumstances tend to indicate that the interrupter 228 is not the interrupter closest to the source of the current fault event.

At block 320, the automation controller 200 either receives a message from upstream peer devices 234 indicating that the fault was interrupted (indicating that an interrupter of an upstream peer device interrupted the fault) or receives a lockout signal from its own interrupter 228 (indicating interrupter 228 interrupted the fault and is isolating connected devices from fault current).

At block 325, the automation controller 200 updates the interrupter status variables 232 in memory 220 based on messages received from upstream peer devices 234 in block 320 (if any) and based on the interrupter status signals received from the interrupter 228 at block 320.

At block 330, the automation controller 200 sends messages indicating the updates to interrupter variables 232 to upstream peer devices 234 and downstream peer devices 236. The automation controller 200 receives messages of the same type from upstream peer devices 234 and downstream peer devices 236.

At block 335, the automation controller 200 transmits, based on the updated interrupter status variables 232 and the messages from the upstream peer devices 234 and downstream peer devices 236, a signal to the interrupter 228 that causes the interrupter 228 to open or (re) close.

At block 340, the automation controller 200 updates the interrupter status variables 232 based on whether the interrupter 228 was opened or closed at block 335.

At block 345, the automation controller 200 sends messages to upstream peer devices 234 and downstream peer devices 236 indicating the updates to interrupter status variables 232 at block 340.

FIG. 4 illustrates a flowchart of an example method of an automation controller (e.g., automation controller 106*b*, 108*b*, 110*b*, 112*b*, or 200) participating in the performance of loss of voltage (LOV) location, isolation, and service restoration functions based on peer-to-peer communications.

In the example shown, the automation controller 200 (at block 405) detects an LOV at interrupter 228. For example, the interrupter 228 may transmit an analog voltage sensor signal to the automation controller 200, and the electronic processor 218 of the automation controller 200 may determine, based on the analog voltage sensor signal, that the interrupter 228 is sensing an LOV event. In another example, the interrupter 228 sends a discrete (i.e., on/off) indicator signal to the electronic processor 218, indicating that the interrupter 228 is experiencing a loss of voltage event.

At block 410, the automation controller 200 sends messages indicating the detected LOV event to upstream peer device 234 and downstream peer devices 236. The automation controller 200 may also receive messages from upstream peer devices 234 or downstream peer devices 236 indicating that those devices are also experiencing an LOV event.

At block 415, the automation controller 200 determines whether a message indicating an LOV event was received only from upstream peer devices 234, or only from downstream peer devices 236.

At block 420, the automation controller 200 increments (e.g., begins counting) an LOV delay timer in the interrupter status variables 232 if a message indicating a LOV event was received only from upstream peer devices 234, or only from downstream peer devices 236. However, the automation controller 200 only increments the LOV delay timer if a message was also received indicating that at least one interrupter is closed on the side of the automation controller 200 that did not receive the message indicating the LOV (the combination of these factors indicates that the interrupter 228 is the first interrupter to experience the LOV). In this way, the automation controllers 200 increases its LOV timer and is delayed from tripping if it was the first to experience the LOV event.

At block 425, the automation controller 200 either sends a signal to the interrupter 228, causing the interrupter 228 to open, based on an expiration of the LOV delay timer, or receives a message from a downstream peer device 234 indicating that the interrupter of the downstream peer device was opened to isolate the LOV.

At block 430, the automation controller 200 updates the interrupter status variables 232 in memory 220 based on the messages received from upstream peer devices 234 and downstream peer devices 236, and any interrupter status signals received from the interrupter 228.

At block 435, the automation controller 200 sends and receives messages indicating the updates to interrupter variables 232 to upstream peer devices 234 and downstream peer devices 236.

At block 440, the automation controller 200 sends a signal to the interrupter 228, causing the interrupter 228 to open or (re) close, based on the updates to interrupter status variables 232 and the messages from upstream peer devices 234 and downstream peer devices 236.

At block 445, the automation controller 200 updates the interrupter status variables 232 based on whether the interrupter 228 was opened or closed at block 440.

At block 450, the automation controller 200 sends messages to upstream peer devices 234 and downstream peer devices 236 indicating the updates to status variables 232 at block 445.

Figure 6:
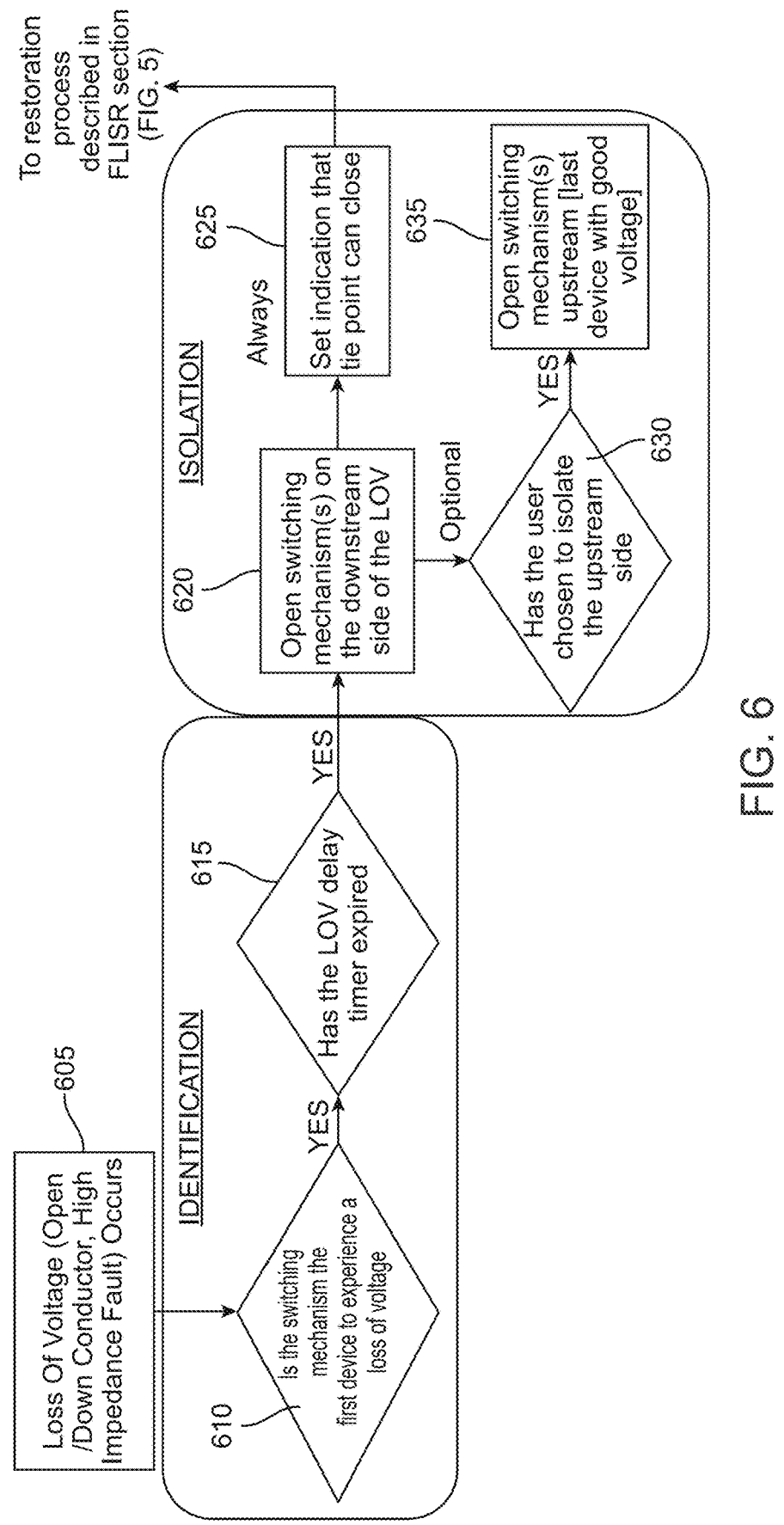
FIG. 6 illustrates a flowchart of a method of using a plurality of automation controllers in a power distribution system to perform LOV response functions using peer-to-peer communications.

FIGS. 5 and 6 are described from the perspective of a plurality of automation controllers 101b collectively participating in FLISR and LOV functions. Accordingly, the descriptions of FIGS. 5 and 6 highlight the actions taken collectively by the plurality of automation controllers 101b, in response to a current fault or an LOV, based on the peer-to-peer automation logic 238 stored in the memory 220 of each automation controller in the plurality of automation controllers 101b.

FIG. 5 illustrates a flowchart of an example method of using a plurality of automation controllers 101b in a power distribution system to perform FLISR functions based on peer-to-peer communications.

At block 505, a fault current event occurs within a power distribution system.

At block 510, the plurality of automation controllers 101b participate in a blocking scheme wherein each of the automation controllers 200 send messages to peer automation controllers (e.g., upstream peer devices 234 or downstream peer devices 236) based on the time at which they receive an interrupter status signal indicating the fault current event. In response to receiving these messages from all connected upstream peer devices 234 and all connected downstream peer devices 236, certain automation controllers 200 send a blocking signal to their interrupter 228, as described with respect to FIG. 3.

At block 515, the plurality of interrupters 101a open to interrupt the fault current, based on blocking signals received. The interrupter 228 interrupter enters a lockout state upon opening, if it opened to interrupt the fault current. In such a case, the interrupter 228 transmits a lockout signal to the automation controller 200, indicating that interrupter 228 has opened to interrupt the fault current. The remaining interrupters 101a do not open at this time because interrupter 228 opened to interrupt the fault the remaining interrupters 101a no longer sense the current fault event. After the interrupter 228 opens, the automation controller 200 transmits a message indicating that the interrupter 228 was locked out to interrupt the fault current to downstream peer devices 236.

At block 520, the plurality of automation controllers 101b determine whether the interrupter 228 that produced the lockout signal is the interrupter closest to the fault. As will be described in greater detail below, the plurality of automation controllers 101b accomplish this by exchanging messages containing data indicating their respective interrupter statuses (e.g., as indicated by their respective interrupter status variables) to peer devices (e.g., upstream peer devices 234 or downstream peer devices 236). The timing, direction, and frequency of these messages is determined according to the peer-to-peer automation logic (e.g., peer-to-peer automation logic 238) and interrupter status variables (e.g., interrupter status variables 232). If the result of the determination is that the fault was not interrupted by the interrupter closest to the fault, the method proceeds to block

525. If the result of the determination is that the fault was interrupted by the interrupter closest to the fault, the method proceeds to block 545.

At block 525, the plurality of automation controller 101b determines which interrupter is closest on the upstream side of the fault. As will be described in greater detail below, the plurality of automation controllers 101b accomplish this, starting at the locked out interrupter 228 and the automation controller 200, by exchanging messages containing information about their respective connected interrupters 101a to downstream peer devices 236 using the peer-to-peer automation logic 238.

At block 530, if a downstream peer device 236 determines that it is closer to the fault than the interrupter 228 that opened, the downstream peer device 236 (upstream of the fault) signals its connected interrupter to open.

At block 535, the downstream peer device 236 (upstream of the fault) updates its own interrupter status variables accordingly and sends out messages to peer devices, indicating that it opened its interrupter to isolate the fault.

At block 540, in response to the message from the downstream peer device 236, the automation controller 200 and the upstream peer devices 234 signal their interrupters to (re) close to restore power up to the downstream device 236 closest to the source of the fault (on the upstream side).

At block 545, the plurality of automation controllers 101b determine, by exchanging messages on the downstream side of the fault, which automation controller 200 is connected to the interrupter 228 closest to fault on the downstream side of the fault. Based on the determination, the automation controller 200 closest to the fault (on the downstream side) signals its connected interrupter 228 to open. In some examples, based on circuit configuration, multiple automation controllers are located on the downstream side of the fault. In those examples, the automation controllers collectively determine which automation controllers are closest to the fault and need to be closed to isolate the fault.

At block 550, the automation controller 200 closest to the fault (on the downstream side) updates its own interrupter status variables 232 accordingly, and sends out messages to downstream peer devices 236, indicating that interrupter(es) 228 opened to isolate the fault. This message is passed along between downstream peer devices 236 until it reaches a tie point (i.e., an automation controller connected to an open interrupter energized by an alternate power source on the downstream side of the fault.).

At block 555, the automation controller 200 of the tie point determines, using capacity and restoration variables 240, whether the alternate power source (e.g., power source 114) can support the load between the tie point and the interrupter 228 opened to isolate the fault on the downstream side. If the result of the determination is that an alternate power source energizing the tie point cannot accommodate additional load, the method proceeds to block 560. Alternatively, if the result of the determination is that the alternate power source energizing the tie point can accommodate the additional load, the method proceeds to block 565.

At block 560, automation controllers 101b on the downstream side of the fault coordinate, using messages, incrementally restoring power from the tie point back to the interrupter 228 that was opened to isolate the fault on the downstream side of the fault. In some embodiments, this includes a segmentation process involving opening every interrupter 228 between the fault and the tie point and closing the interrupters 101a one by one from the tie point to the fault. When an interrupter 228 is closed, the automation controllers 101b downstream of the fault exchange messages with each other and reassess whether the alternate power source can accommodate the additional load connected to an additional interrupter 228. When it is determined that the alternate power source cannot accommodate the additional load, the process of closing the interrupters 101a one by one stops. In some embodiments, the segmentation processes does not involve opening every interrupter 228, and only involves opening the interrupter directly upstream (on the side of the faulted section) of the tie point.

At block 565, as an alternative to block 560, if the result of the determination at block 555 is that the alternate power source energizing the tie point can accommodate the additional load, no additional interrupters 101a are opened on the downstream side of the fault and the tie point closes to restore power on the downstream side of the fault up to the interrupter 228 that was opened to isolate the fault on the downstream side of the fault.

FIG. 6 illustrates a flowchart of an example method of using a plurality of automation controllers 101b in a power distribution system to perform LOV location, isolation and service restoration functions based on peer-to-peer communications.

At block 605, a loss of voltage event occurs within a power distribution system 100.

At block 610, the automation controllers 101b exchange messages to determine which of the interrupters 101a experienced the LOV event first. The automation controllers 101b accomplish this by exchanging messages containing data indicating their respective interrupter statuses (e.g., as indicated by their respective interrupter status variables) to peer devices (e.g., upstream peer devices 234 or downstream peer devices 236). The timing, direction, and frequency of these messages is determined according to the peer-to-peer automation logic (e.g., peer-to-peer automation logic 238) and interrupter status variables (e.g., interrupter status variables 232). Automation controllers 101b that experienced the LOV event first each increment a local LOV delay timer, as described with respect to FIG. 4.

At block 615, the automation controllers 101b determine whether their local LOV delay timers are expired.

At block 620, based on an expiration of its local LOV delay timer, one of the automation controllers 200 sends a signal to the interrupter 228, causing the interrupter 228 to open.

At block 625, the first automation controller 200 to experience the LOV event updates its own interrupter status variables 232 accordingly, and sends out messages to downstream peer devices 236, indicating that interrupter 228 opened to isolate the LOV. This message is passed along between downstream peer devices 236 until it reaches a tie point (i.e., an automation controller connected to an open interrupter energized by an alternate power source on the downstream side of the LOV).

After block 625, the process proceeds to block 555, described above. Block 555 is described with respect to restoring power up to an isolated point of fault. However, when proceeding from block 625, the method would occur similarly to restore power up to an isolated point of loss of voltage.

If the plurality of automation controllers 101b are configured to perform isolation of the upstream side of the LOV, the method proceeds to block 630. At block 630, the automation controller 200 that signaled its interrupter 228 to open and isolate the LOV sends a message to upstream peer device 234 indicating that the interrupter 228 was opened to isolate an LOV.

At block 635, the upstream peer device 234 opens its interrupter, to isolate the upstream side of the LOV.

Figure 7:
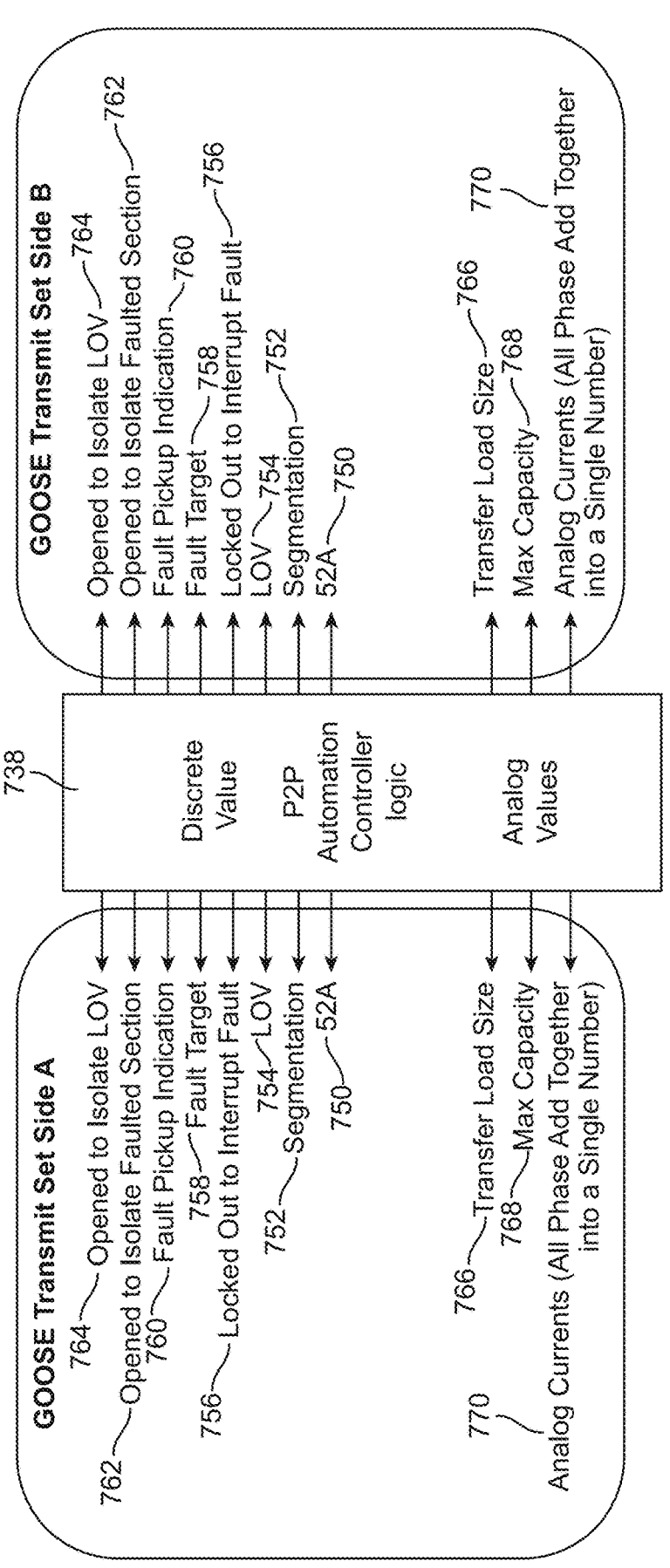
FIG. 7 illustrates GOOSE messages that an automation controller is configured to transmit to other automation controllers in peer-to-peer communications.

FIG. 7 illustrates peer-to-peer automation logic 738, that may be carried out, for example, by one or more of the plurality of automation controllers 101b mentioned above. FIG. 7 also illustrates various messages, for example, GOOSE messages. The messages are divided into transmit set side A and transmit set side B types and the messages may represent discrete or analog values or may include a payload representing discrete and/or analog values. The plurality of automation controllers 101b may be configured to transmit these messages to other automation controllers (e.g., automation controller 106b, 108b, 110b, and 112b) in a peer-to-peer communication scheme, according to the methods described above. In the example shown, the peer-to-peer automation logic 738 is configured to produce a 52A message 750, a segmentation message 752, an LOV message 754, a locked out to interrupt fault message 756, a fault target message 758, a fault pickup indication message 760, an opened to isolate faulted section message 762, a opened to isolate LOV message 764, a transfer load size message 766, a max capacity message 768, and an analog currents message 770. The interrupter status variables 232 may include a variable contained in the messages. The automation controller 200 implements the peer-to-peer automation logic 238 or is otherwise configured to update the interrupter status variables 232 based on the messages received from peer devices.

The 52A message 750 indicates that the interrupter 228 connected to the sending automation controller 200 is closed.

The segmentation message 752 indicates that the sending automation controller 200 intends to close to reconnect to a power source (e.g., power source 102) for the purpose of segmented power restoration.

The LOV message 754 indicates that the interrupter 228 connected to the sending automation controller 200 is experiencing a loss of voltage.

The locked out to interrupt fault message 756 indicates that the interrupter 228 connected to the sending automation controller 200 is opened to interrupt a fault.

The fault target message 758 indicates that the interrupter 228 connected to the sending automation controller 200 was sensing a fault current and either opened to interrupt the fault or an upstream interrupter was opened to interrupt the fault.

The fault pickup indication message 760 indicates that the interrupter 228 connected to the sending automation controller 200 is presently sensing a fault current.

The opened to isolate faulted section message 762 indicates that a de-asserted 52A signal, a lockout signal, and a fault target signal was received by the automation controller 200 from the interrupter 228, and that the sending automation controller 200 is receiving a fault target message on only one of the upstream peer device messaging interface 224 or the downstream peer device messaging interface 226.

These messages may be used by the electronic processor 218 to update the interrupter status variables 232 and the capacity and restoration variables 240. The electronic processor may produce these messages accordingly for transmission to other automation controllers (e.g., automation controller 106b, 108b, 110b, and 112b) in peer-to-peer messages according to peer-to-peer automation logic 238, as described above.

FLISR functions and LOV location, isolation, and service restoration functions can be performed using peer-to-peer messaging and the messages as described with respect to FIG. 7. An example of using the messages described above to achieve fault isolation can be implemented as follows. An interrupter 228 in a plurality of interrupters 101*a* may, upon sensing a fault current, send a fault current pickup indication signal to its automation controller 200, and then open and lock out to interrupt a fault. As a result of the interrupter 228 opening and locking out, the automation controller 200 will receive a de-asserted 52A signal from interrupter 228, indicating that the interrupter 228 is open. The automation controller 200 will also receive a lockout signal (indicating that the interrupter 228 is in a lockout state) and a fault target signal (indicating that the interrupter 228 was sensing a fault current and opened in response) from the interrupter 228. The automation controller 200 will send a locked out to interrupt fault message 756 to the de-energized downstream peer devices 236. Upon receiving the locked out to interrupt fault message 756, the de-energized downstream peer device 236 will pass the message to subsequent downstream peer devices if the downstream peer device 236 also received a fault target signal from its own interrupter and is also receiving a message containing a fault target message 758 from all its peer devices. If the downstream peer device 236 is only receiving a fault target message 758 from one direction, the downstream peer device 236 will signal its own interrupter to open to isolate the fault. After the interrupter of the downstream peer device 236 opens, the interrupter will then transmit a de-asserted 52A signal to the downstream peer device 236, indicating that the interrupter of the downstream peer device 236 is open. The interrupter will also transmit to the downstream peer device 236 a lockout signal (indicating that the interrupter is in a lockout state) and a fault target signal (indicating that the interrupter was sensing a fault current and opened in response). The downstream peer device 236 will then transmit an opened to isolate faulted section message 762 downstream. This message will be communicated downstream by de-energized downstream devices. If the receiving automation controller determines that it is only receiving a fault target message 758 from one direction and is not receiving a fault target signal from its own interrupter, the receiving automation controller will signal its interrupter to open to isolate a faulted section. The receiving automation module then sends its own opened to isolate faulted section message 762 in the direction without fault targets (i.e., in the direction of additional, de-energized automation controllers). This messaging pattern continues until an opened to isolate faulted section message 762 is received by an automation controller connected to an interrupter that is already opened (e.g., an open tie point). When the automation controller connected to the open interrupter receives the opened to isolate faulted section message 762, it begins the restoration process described above using peer-to-peer messaging.

For brevity, message-level details regarding the restoration, segmentation, and capacity determination processes are not described in detail herein. However, the general processes are described above with respect to FIGS. 5 and 6.

It should be noted that a plurality of hardware and software-based devices, as well as a plurality of different structural components may be utilized in various implementations. Aspects, features, and instances may include hardware, software, and electronic components or modules that, for purposes of discussion, may be illustrated and described as if many of the components were implemented solely in hardware. However, one of ordinary skill in the art, and based on a reading of this detailed description, would recognize that, in at least one instance, the electronic based aspects of the invention may be implemented in software (for example, stored on non-transitory computer-readable medium) executable by one or more processors. Consequently, it should be noted that a plurality of hardware and software-based devices, as well as a plurality of different structural components may be utilized to implement the invention. For example, "control units" and "controllers" described in the specification can include one or more electronic processors, one or more memories including a non-transitory computer-readable medium, one or more input/output interfaces, and various connections (for example, a system bus) connecting the components.

Unless the context of their usage unambiguously indicates otherwise, the articles "a," "an," and "the" should not be interpreted as meaning "one" or "only one." Rather these articles should be interpreted as meaning "at least one" or "one or more." Likewise, when the terms "the" or "said" are used to refer to a noun previously introduced by the indefinite article "a" or "an," "the" and "said" mean "at least one" or "one or more" unless the usage unambiguously indicates otherwise.

It should also be understood that although certain drawings illustrate hardware and software located within particular devices, these depictions are for illustrative purposes only. In some embodiments, the illustrated components may be combined or divided into separate software, firmware, and/or hardware. For example, instead of being located within and performed by a single electronic processor, logic and processing may be distributed among multiple electronic processors. Regardless of how they are combined or divided, hardware and software components may be located on the same computing device or may be distributed among different computing devices connected by one or more networks or other suitable connections or links.

Thus, in the claims, if an apparatus or system is claimed, for example, as including an electronic processor or other element configured in a certain manner, for example, to make multiple determinations, the claim or claim element should be interpreted as meaning one or more electronic processors (or other element) where any one of the one or more electronic processors (or other element) is configured as claimed, for example, to make some or all of the multiple determinations collectively. To reiterate, those electronic processors and processing may be distributed.

The use of "including," "comprising," or "having" and variations thereof are meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. As used within this document, the word "or" may mean inclusive or. As a non-limiting example, if it were stated in this document that "item Z may comprise element A or B," this may be interpreted to disclose an item Z comprising only element A, an item Z comprising only element B, as well as an item Z comprising elements A and B.

Although the disclosure has been described in detail with reference to certain preferred embodiments, variations and modifications exist within the scope and spirit of one or more independent aspects of the disclosure as described. In addition, some aspects of the present disclosure may include, but are not limited to:

REPRESENTATIVE FEATURES

Representative features are set out in the following clauses, which stand alone or may be combined, in any combination, with one or more features disclosed in the text and/or drawings of the specification.

Clause 1. An automation controller comprising:

an electronic processor;

a memory;

a first peer messaging interface configured to connect to a first peer device;

a second peer messaging interface configured to connect to a second peer device; and, an input/output interface configured to connect to an interrupter;

wherein the electronic processor is configured to:

receive, via the input/output interface, an interrupter status signal;

transmit, via the first or second peer messaging interface, a message to a peer device based on the interrupter status signal;

receive, via the first or second peer messaging interface, a message from the peer device indicating a status of a peer interrupter;

update an interrupter status variable in memory based on the status of the peer interrupter and the interrupter status signal; and, transmit a signal, via the input/output interface, to open or close the interrupter based on the updated interrupter status variable.

Clause 2. The automation controller of clause 1, wherein the message from the peer device includes a loss of voltage message.

Clause 3. The automation controller of clause 1 or 2, wherein the message from the peer device includes a fault pickup indication message.

Clause 4. The automation controller of clauses 1-3, wherein the memory further includes sensor data.

Clause 5. The automation controller of clause 4, wherein the electronic processor is further configured to transmit a signal, via the input/output interface, to open or close the interrupter based on the sensor data.

Clause 6. The automation controller of clauses 1-4, wherein the electronic processor is further configured to message peers based on the updated interrupter status variable.

Clause 7. The automation controller of clauses 1-6, wherein the interrupter status variable is updated based on one of:

a fault pickup indicator, indicating that the interrupter is experiencing a fault current;

a loss of voltage indicator, indicating that the interrupter is experiencing a loss of a loss of voltage isolation indicator, indicating whether the interrupter was opened to isolate a loss of voltage;

a fault isolation indicator, indicating whether the interrupter was opened to isolate a faulted circuit segment;

a fault target, indicating that the interrupter was opened to interrupt a fault current;

a fault lockout indicator, indicating that the interrupter is in a lockout state;

a closed indicator, indicating that the interrupter is closed; and, a segmentation indicator, indicating that the automation controller received a segmentation message from a peer device.

Clause 8. An interrupter comprising:

a switch; and, an automation controller including:

an electronic processor;

a memory;

a first peer messaging interface configured to connect to a first peer device; and, a second peer messaging interface configured to connect to a second peer device;

wherein the electronic processor is configured to:

receive an interrupter status signal from the switch;

transmit, via the first or second peer messaging interface, a message to a peer device based on the interrupter status signal;

receive, via the first or second peer messaging interface, a message from the peer device indicating a status of a peer interrupter;

update an interrupter status variable in memory based on the status of the peer interrupter and the interrupter status signal; and, open or close the switch based on the updated interrupter status variable.

Clause 9. The interrupter of clause 8, wherein the message from the peer device includes a loss of voltage message.

Clause 10. The interrupter of clause 8 or 9, wherein the message from the peer device includes a fault pickup indication message.

Clause 11. The interrupter of clauses 8-10, wherein the memory further includes sensor data.

Clause 12. The interrupter of clause 11, wherein the electronic processor is further configured to transmit a signal, to the switch, to open or close the switch based on the sensor data.

Clause 13. The interrupter of clause 8-12, wherein the electronic processor is further configured to message peers based on the updated interrupter status variable.

Clause 14. The interrupter of clause 8-13, wherein the interrupter status variable is updated based on one of:

a fault pickup indicator, indicating that the interrupter is experiencing a fault current;

a loss of voltage indicator, indicating that the interrupter is experiencing a loss of voltage;

a loss of voltage isolation indicator, indicating whether the interrupter was opened to isolate a loss of voltage;

a fault isolation indicator, indicating whether the interrupter was opened to isolate a faulted circuit segment;

a fault target, indicating that the interrupter was opened to interrupt a fault current;

a fault lockout indicator, indicating that the interrupter is in a lockout state;

a closed indicator, indicating that the interrupter is closed; and, a segmentation indicator, indicating that the automation controller received a segmentation message from a peer device.

Clause 15. A non-transitory computer-readable medium containing instructions that when executed by an electronic processor of an automation controller in a power distribution system cause the electronic processor to:

receive, via an input/output interface of the automation controller, an interrupter status signal;

transmit, via a first peer messaging interface or a second peer messaging interface of the automation controller, a message to a peer device in the power distribution system based on the interrupter status signal;

receive, via a first or second peer messaging interface of the automation controller, a message from the peer device indicating a status of a peer interrupter;

update an interrupter status variable in a memory of the automation controller based on the status of the peer interrupter and the interrupter status signal; and, transmit a signal, via the input/output interface of the automation controller, to open or close the interrupter based on the updated interrupter status variable.

Clause 16. The non-transitory computer-readable medium of clause 15, wherein the message from the peer device includes a loss of voltage message.

Clause 17. The non-transitory computer-readable medium of clause 15 or 16, wherein the message from the peer device includes a fault pickup indication message.

Clause 18. The non-transitory computer-readable medium of clause 15-17, wherein the electronic processor is further configured to message peers based on the updated interrupter status variable.

Clause 19. The non-transitory computer-readable medium of clause 15-18, wherein the memory further includes sensor data.

Clause 20. The non-transitory computer-readable medium of clause 19, wherein the electronic processor is further configured to transmit a signal, via the input/output interface, to open or close the interrupter based on the sensor data.

Various embodiments, examples, features, and advantages are set forth in the following claims.

The invention claimed is:

1. An automation controller comprising:
an electronic processor;
a memory;
a first peer messaging interface configured to connect to a first peer device;
a second peer messaging interface configured to connect to a second peer device; and,
an input/output interface configured to connect to an interrupter;
wherein the electronic processor is configured to:
receive, via the input/output interface, an interrupter status signal;
transmit, via the first or second peer messaging interface, a message to a peer device based on the interrupter status signal;
receive, via the first or second peer messaging interface, a message from the peer device indicating a status of a peer interrupter;
update an interrupter status variable in memory based on the status of the peer interrupter and the interrupter status signal; and,
transmit a signal, via the input/output interface, to open or close the interrupter based on the updated interrupter status variable.

2. The automation controller of claim 1, wherein the message from the peer device includes a loss of voltage message.

3. The automation controller of claim 1, wherein the message from the peer device includes a fault pickup indication message.

4. The automation controller of claim 1, wherein the memory further includes sensor data.

5. The automation controller of claim 4, wherein the electronic processor is further configured to transmit a signal, via the input/output interface, to open or close the interrupter based on the sensor data.

6. The automation controller of claim 1, wherein the electronic processor is further configured to message peers based on the updated interrupter status variable.

7. The automation controller of claim 6, wherein the interrupter status variable is updated based on one of:
a fault pickup indicator, indicating that the interrupter is experiencing a fault current;
a loss of voltage indicator, indicating that the interrupter is experiencing a loss of voltage;
a loss of voltage isolation indicator, indicating whether the interrupter was opened to isolate a loss of voltage;
a fault isolation indicator, indicating whether the interrupter was opened to isolate a faulted circuit segment;
a fault target, indicating that the interrupter was opened to interrupt a fault current;
a fault lockout indicator, indicating that the interrupter is in a lockout state;
a closed indicator, indicating that the interrupter is closed; and,
a segmentation indicator, indicating that the automation controller received a segmentation message from a peer device.

8. An interrupter comprising:
a switch; and,
an automation controller including:
an electronic processor;
a memory;
a first peer messaging interface configured to connect to a first peer device; and,
a second peer messaging interface configured to connect to a second peer device;
wherein the electronic processor is configured to:
receive an interrupter status signal from the switch;
transmit, via the first or second peer messaging interface, a message to a peer device based on the interrupter status signal;
receive, via the first or second peer messaging interface, a message from the peer device indicating a status of a peer interrupter;
update an interrupter status variable in memory based on the status of the peer interrupter and the interrupter status signal; and,
open or close the switch based on the updated interrupter status variable.

9. The interrupter of claim 8, wherein the message from the peer device includes a loss of voltage message.

10. The interrupter of claim 8, wherein the message from the peer device includes a fault pickup indication message.

11. The interrupter of claim 8, wherein the memory further includes sensor data.

12. The interrupter of claim 11, wherein the electronic processor is further configured to transmit a signal, to the switch, to open or close the switch based on the sensor data.

13. The interrupter of claim 8, wherein the electronic processor is further configured to message peers based on the updated interrupter status variable.

14. The interrupter of claim 13, wherein the interrupter status variable is updated based on one of:
a fault pickup indicator, indicating that the interrupter is experiencing a fault current;
a loss of voltage indicator, indicating that the interrupter is experiencing a loss of voltage;
a loss of voltage isolation indicator, indicating whether the interrupter was opened to isolate a loss of voltage;
a fault isolation indicator, indicating whether the interrupter was opened to isolate a faulted circuit segment;

a fault target, indicating that the interrupter was opened to interrupt a fault current;

a fault lockout indicator, indicating that the interrupter is in a lockout state;

a closed indicator, indicating that the interrupter is closed; and, a segmentation indicator, indicating that the automation controller received a segmentation message from a peer device.

15. A non-transitory computer-readable medium containing instructions that when executed by an electronic processor of an automation controller in a power distribution system cause the electronic processor to:

receive, via an input/output interface of the automation controller, an interrupter status signal;

transmit, via a first peer messaging interface or a second peer messaging interface of the automation controller, a message to a peer device in the power distribution system based on the interrupter status signal;

receive, via a first or second peer messaging interface of the automation controller, a message from the peer device indicating a status of a peer interrupter;

update an interrupter status variable in a memory of the automation controller based on the status of the peer interrupter and the interrupter status signal; and, transmit a signal, via the input/output interface of the automation controller, to open or close the interrupter based on the updated interrupter status variable.

16. The non-transitory computer-readable medium of claim 15, wherein the message from the peer device includes a loss of voltage message.

17. The non-transitory computer-readable medium of claim 15, wherein the message from the peer device includes a fault pickup indication message.

18. The non-transitory computer-readable medium of claim 15, wherein the electronic processor is further configured to message peers based on the updated interrupter status variable.

19. The non-transitory computer-readable medium of claim 15, wherein the memory further includes sensor data.

20. The non-transitory computer-readable medium of claim 19, wherein the electronic processor is further configured to transmit a signal, via the input/output interface, to open or close the interrupter based on the sensor data.

* * * * *